(No Model.)
E. G. CORBETT.
VEHICLE WHEEL.
No. 580,483. Patented Apr. 13, 1897.
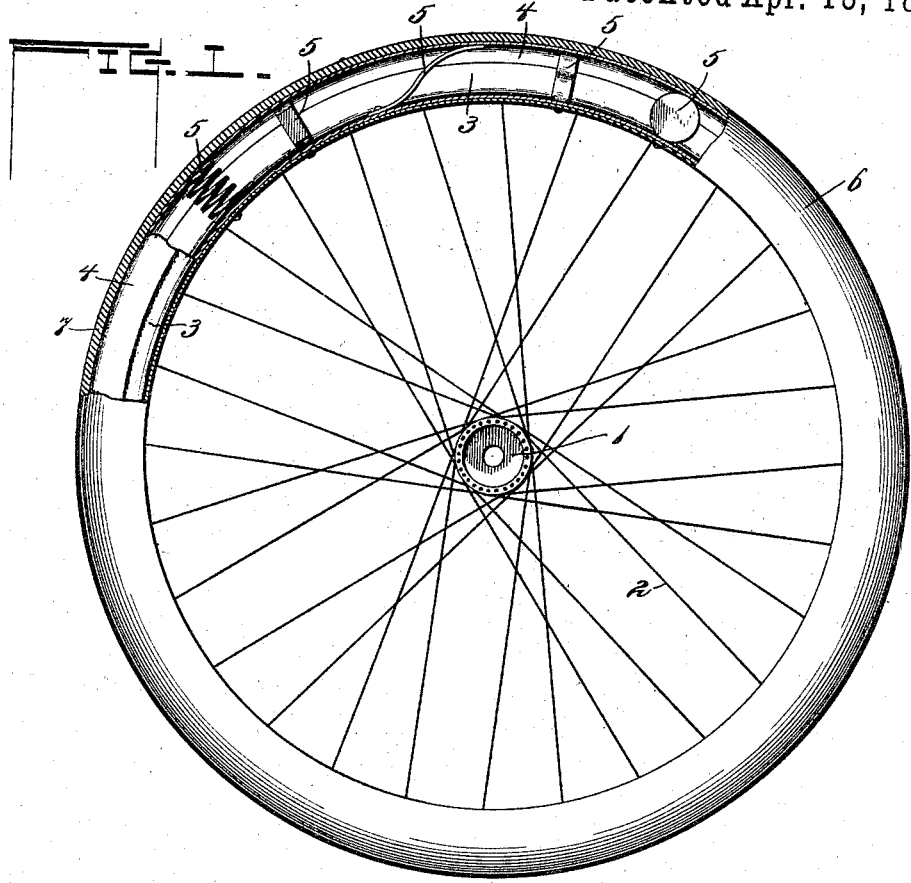
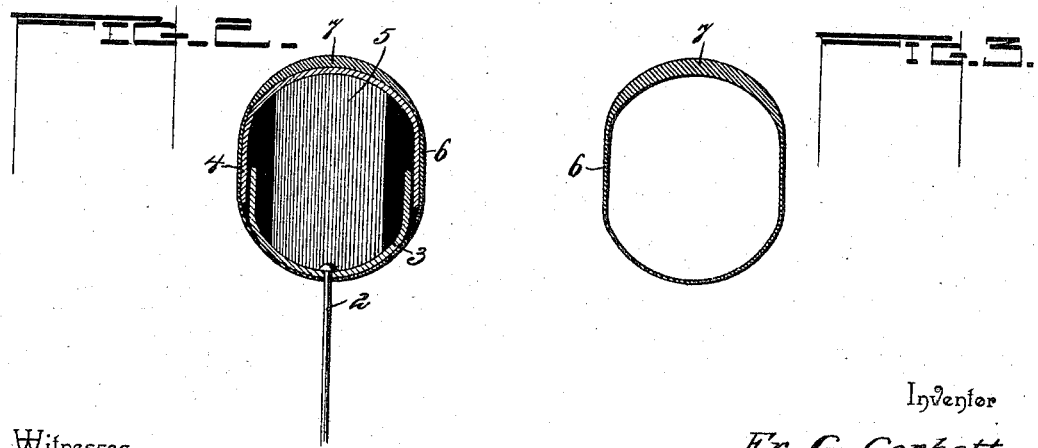
Witnesses
Milton O'Connell
V. B. Hillyard
Inventor
Er G. Corbett,
By his Attorneys,
C. A. Snow & Co.

UNITED STATES PATENT OFFICE.

ER GABRIEL CORBETT, OF COLUMBUS, OHIO.

VEHICLE-WHEEL.

SPECIFICATION forming part of Letters Patent No. 580,483, dated April 13, 1897.

Application filed November 20, 1896. Serial No. 612,872. (No model.)

*To all whom it may concern:*

Be it known that I, ER GABRIEL CORBETT, a citizen of the United States, residing at Columbus, in the county of Franklin and State of Ohio, have invented a new and useful Vehicle-Wheel, of which the following is a specification.

This invention aims to provide a wheel for bicycles, kindred machines, and road-vehicles which will possess all the advantages of a wheel having a pneumatic tire in point of lightness and resiliency, so as to render riding comparatively easy, and which will possess the further advantage of being invulnerable or practically non-puncturable.

The improvement relates more particularly to the tire, which is composed of inner and outer telescoping rims, having a space between them in which are located a series of buffers or cushions, either of rubber or metallic springs, the rims being of approximately U form in cross-section and inversely disposed, the side pieces of the outer rim embracing the sides of the inner rim, and the whole being inclosed within a jacket or covering of rubber for the dual purpose of preventing slipping and protecting the joint formed between the rims, so as to exclude foreign matter, such as mud, trash, and the like, which would have a tendency to prevent the free movement of the outer rim upon the inner rim.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a side elevation of a vehicle-wheel having the invention applied, parts of the rim being broken away to illustrate more fully the detailed construction and relative arrangement of the parts. Fig. 2 is a cross-section of the rim on a larger scale. Fig. 3 is a transverse section of the rim covering or jacket.

Corresponding and like parts are referred to in the following description and indicated in the several views of the drawings by the same reference-characters.

The wheel comprises a hub 1, spokes 2, and an outer rim, which is formed of sections in the shape of rims, the inner rim 3 being secured to the spokes in any convenient and substantial manner and the outer rim 4 telescoping with the inner rim and forming a space therewith, in which are located a series of buffers or elastic cushions 5, the latter being either rubber blocks, coil or flat metal springs.

The rims 3 and 4 are of substantially U form and are inversely disposed, the side flanges or pieces of the outer rim embracing the side flanges or pieces of the inner rim, the joint between the telescoping parts being of such character as to reduce the friction to a minimum amount and obviate any lateral play of the outer rim. The rims are of metal, preferably steel, and the part located between the side pieces is curved so as to present an exterior convex surface, which is of advantage to secure easy riding and enable the inner rim to shed water and dirt. The outer rim will be formed of sections, which are brazed, soldered, or secured together in any substantial manner after the rim is fitted to the inner rim, this being necessary because of the telescoping character of the complementary parts or rim-sections. The buffers or elastic cushions are located at intervals in the circumferential length of the rim and are secured to either the inner or the outer rim, or to both, as may be found necessary, in order to provide a wheel of substantial construction. The two rims are inclosed by a covering or jacket 6, preferably of rubber, and this jacket is molded or constructed in any of the usual ways and is separable on a line corresponding with the medial line of the inner rim 3, the separable edges being secured together by being laced, cemented, or in any manner desired. The tread-surface of the jacket is thickened, as shown at 7, and gradually diminishes in thickness from a medial line toward the sides, thereby providing sufficient material in order to insure the usefulness of the wheel or tire for a reasonable period. The casing or jacket, being elastic, adapts itself to the relative position of the rims and forms a protector for the joint between the side pieces or flanges, so as to exclude foreign matter therefrom.

Having thus described the invention, what is claimed as new is—

In a vehicle-wheel, a hollow tire composed of similarly-formed rims inversely disposed and having their side portions parallel and telescopically related, the side flanges of the outer rim embracing the side flanges of the inner rim, and the inner and outer portions being convex on their outer surface, the inner rim having direct connection with the outer ends of the spokes, elastic or spring cushions interposed between the rims, and a casing or jacket of india-rubber enveloping the rims and having its tread-surface thickened and gradually diminishing in thickness toward the sides of the tire and separable on a line corresponding with the medial line of the inner rim, substantially as and for the purpose set forth.

In testimony that I claim the foregoing as my own I have hereto affixed my signature in the presence of two witnesses.

ER GABRIEL CORBETT.

Witnesses:
Z. W. POTTER,
C. D. POTTER.